(12) United States Patent
Sasaki et al.

(10) Patent No.: US 10,769,930 B2
(45) Date of Patent: Sep. 8, 2020

(54) FORGETTING-TO-CARRY PREVENTION ASSISTANCE METHOD, TERMINAL DEVICE, AND FORGETTING-TO-CARRY PREVENTION ASSISTANCE SYSTEM

(71) Applicant: Toyota Jidosha Kabushiki Kaisha, Toyota-shi, Aichi-ken (JP)

(72) Inventors: Akira Sasaki, Miyoshi (JP); Masashi Nakagawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/295,452

(22) Filed: Mar. 7, 2019

(65) Prior Publication Data
US 2019/0279488 A1    Sep. 12, 2019

(30) Foreign Application Priority Data
Mar. 9, 2018   (JP) .................................. 2018-043059

(51) Int. Cl.
*G08B 21/24*  (2006.01)
*H04W 4/48*   (2018.01)
*G06F 9/54*   (2006.01)

(52) U.S. Cl.
CPC ............. *G08B 21/24* (2013.01); *G06F 9/542* (2013.01); *H04W 4/48* (2018.02)

(58) Field of Classification Search
CPC ...................................................... G08B 21/24
USPC ........................................................ 340/540
See application file for complete search history.

(56) References Cited

U.S. PATENT DOCUMENTS

| | | | |
|---|---|---|---|
| 7,419,095 B2* | 9/2008 | Yoshioka | G06Q 10/10 235/384 |
| 2009/0157291 A1* | 6/2009 | Kudo | G01C 21/3679 701/532 |
| 2018/0146356 A1* | 5/2018 | Bai | H04W 76/11 |
| 2018/0223584 A1* | 8/2018 | Bradley | B60N 2/002 |

FOREIGN PATENT DOCUMENTS

| | | |
|---|---|---|
| JP | 2005283368 A | 10/2005 |
| JP | 2005284771 A | 10/2005 |
| JP | 2010055291 A | 3/2010 |

* cited by examiner

*Primary Examiner* — Qutbuddin Ghulamali
(74) *Attorney, Agent, or Firm* — Dinsmore & Shohl LLP

(57) ABSTRACT

A forgetting-to-carry prevention assistance method assists, in a terminal device, a user in preventing forgetting to carry a personal item. The forgetting-to-carry prevention assistance method includes acquiring a destination for the user; detecting the personal item that exists around the user; and in a case where the personal item associated with a category of the destination is not detected, notifying information on the personal item that is not detected.

5 Claims, 10 Drawing Sheets

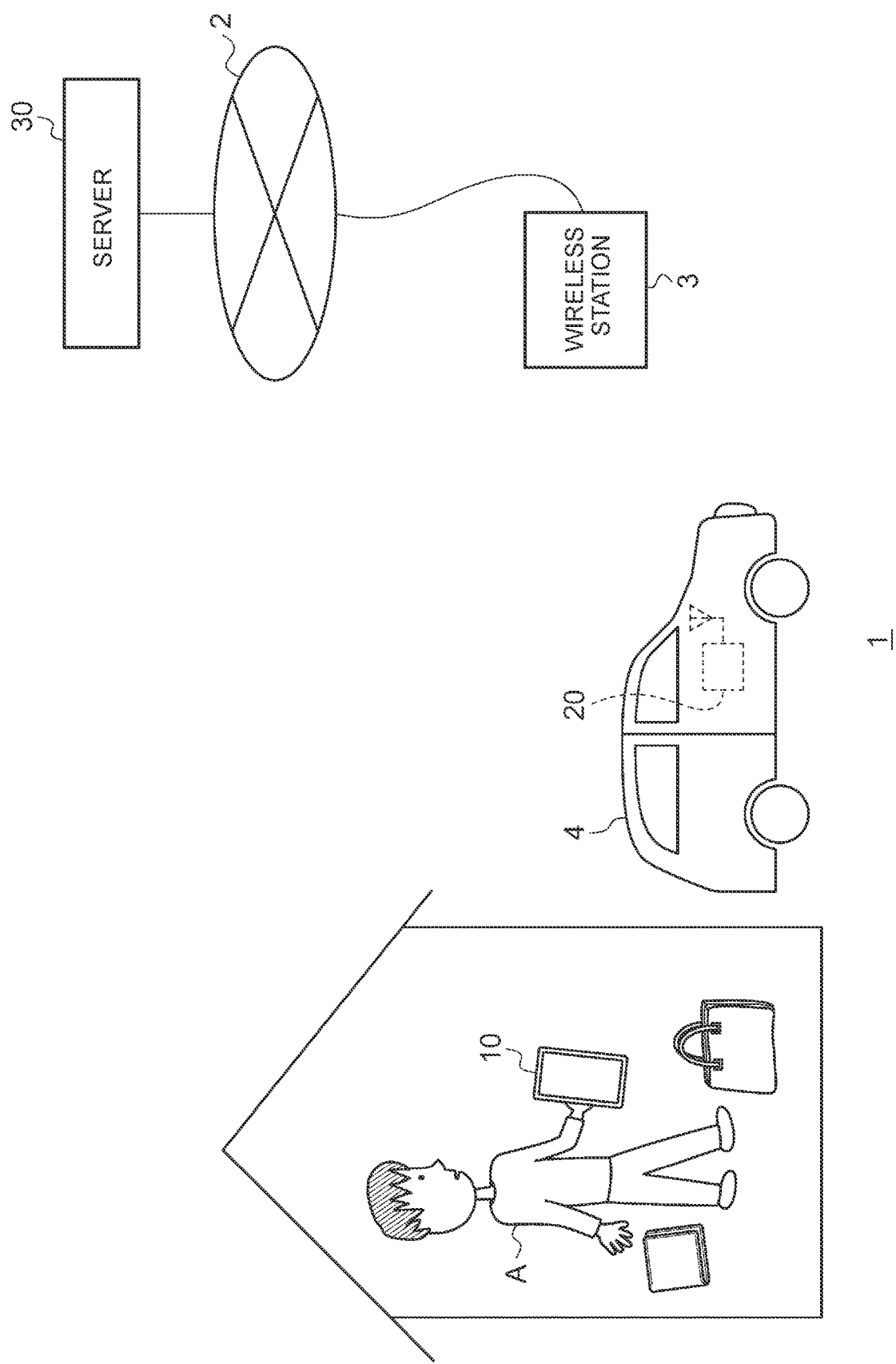

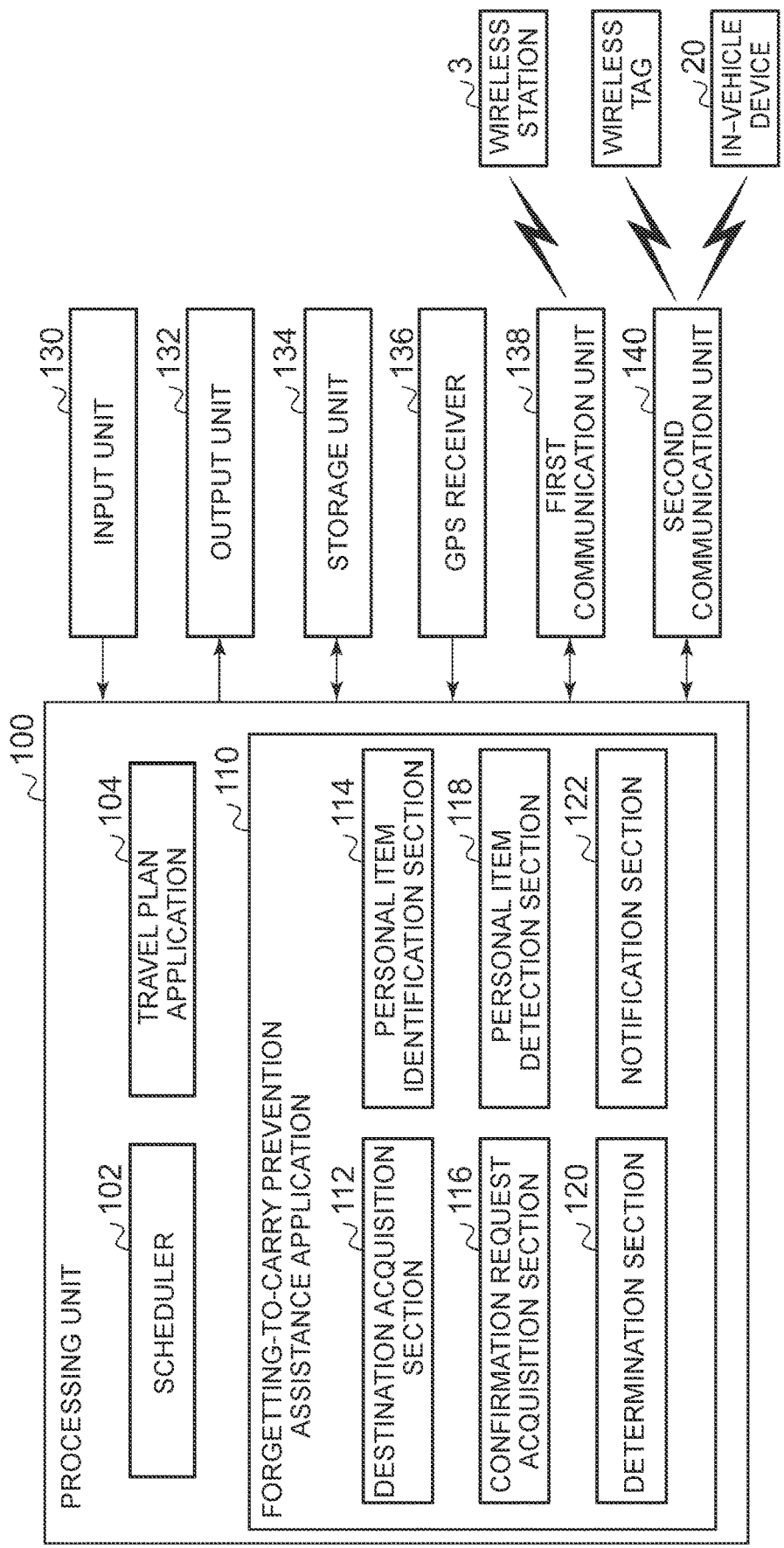

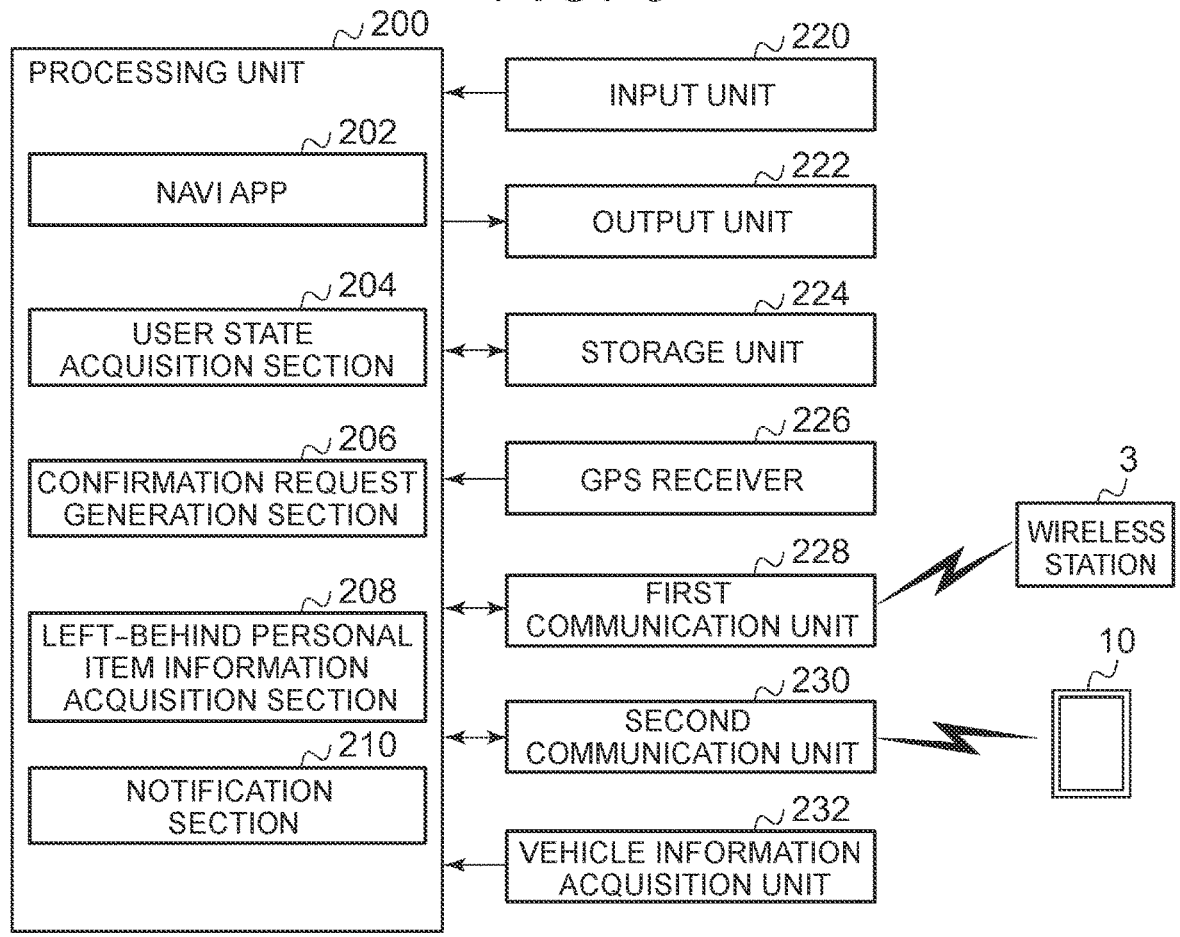

FIG. 5A

```
TAG REGISTRATION SCREEN
                                    ALWAYS NOTIFY
11a —  [1]  (TAG UNREGISTERED)        ☐
            NOTIFICATION DISTANCE    FAR·NORMAL·
                                      NEAR
                                    ALWAYS NOTIFY
11b —  [2]  (TAG UNREGISTERED)        ☐
            NOTIFICATION DISTANCE    FAR·NORMAL·
                                      NEAR
                                    ALWAYS NOTIFY
11c —  [3]  (TAG UNREGISTERED)        ☐
            NOTIFICATION DISTANCE    FAR·NORMAL·
                                      NEAR
                                    ALWAYS NOTIFY
11d —  [4]  (TAG UNREGISTERED)        ☐
            NOTIFICATION DISTANCE    FAR·NORMAL·
                                      NEAR
```

```
TAG REGISTRATION SCREEN
                                    ALWAYS NOTIFY
       [1]  (TAG UNREGISTERED)        ☐
            NOTIFICATION DISTANCE    FAR·NORMAL·
                                      NEAR

SELECT TAG TO NOTIFY
       LEFT-BEHIND PERSONAL ITEM 1 0 0 0 0 1 0 0    ▲
            1 0 0 0 0 1 0 1    ≡
       12 — 1 0 0 3 0 2 0 0
            1 0 0 3 0 2 1 1
            2 1 3 9 1 0 2 1    ▼
```

"XYZ COMPANY" IS SET AS DESTINATION.
DID YOU FORGET TO CARRY YOUR "WALLET"?

222

132

FORGETTING-TO-CARRY PREVENTION ASSISTANCE METHOD, TERMINAL DEVICE, AND FORGETTING-TO-CARRY PREVENTION ASSISTANCE SYSTEM

CROSS-REFERENCE TO RELATED APPLICATIONS

This application claims priority to Japanese Patent Application No. 2018-043059 filed on Mar. 9, 2018, which is incorporated herein by reference in its entirety including the specification, drawings and abstract.

BACKGROUND

1. Technical Field

The disclosure relates to a technique of assisting a user in preventing forgetting to carry his/her personal item.

2. Description of Related Art

In Japanese Patent Application Publication No. 2010-55291 (JP 2010-55291 A), a system that is mounted on an automobile is disclosed. The in-vehicle system includes means for outputting a message that urges a user to confirm whether the user carries each personal item included in a personal item list corresponding to a mobile phone that can communicate with the system via near field wireless communication. In this in-vehicle system, in the case where a current location of the automobile is a location that corresponds to a registered base location, a voice message is output from a speaker, the voice massage urging the user to confirm that the user does not forget to carry each personal item.

SUMMARY

The in-vehicle system disclosed in JP 2010-55291 A gives a reminder so that the user does not forget to carry each personal item at a start of the automobile, and gives the reminder even when the user does not forget to carry each personal item. Thus, the user may be bothered by the reminder. In addition, although the personal item(s) to be carried generally differ(s) according to the destination, the in-vehicle system disclosed in JP 2010-55291 A always gives the reminder regarding the same personal items.

The disclosure provides a technique of appropriately assisting a user in preventing forgetting to carry a personal item.

A first aspect of the disclosure relates to a forgetting-to-carry prevention assistance method that assists, in a terminal device, a user in preventing forgetting to carry a personal item. The forgetting-to-carry prevention assistance method includes acquiring a destination for the user; detecting the personal item that exists around the user; and in a case where the personal item associated with a category of the destination is not detected, notifying information on the personal item that is not detected.

According to the first aspect, in the case where the personal item that is associated with the category of the destination is not detected around the user, the information on the personal item that is not detected can be notified (in other words, the terminal device can notify the information on the personal item that is not detected).

Detecting the personal item may include detecting a distance from the personal item; and notifying the information may include, in a case where the distance from the personal item associated with the category of the destination exceeds a specified distance, notifying the information on the personal item. In the case where the distance between the terminal device and the personal item is long, there is a possibility that the user has forgotten to carry the personal item, and thus, the information on the personal item may be notified (in other words, the terminal device may notify the information on the personal item that is detected, and that is located at the distance exceeding the specified distance from the terminal device).

The personal item may be detected when a confirmation request that is sent from an in-vehicle device mounted on a vehicle is received. The in-vehicle device may send the confirmation request to the terminal device, based on information on a state of the vehicle. The forgetting-to-carry prevention assistance method may further include determining that the user has forgotten to carry the personal item in the case where the distance from the personal item exceeds the specified distance.

A second aspect of the disclosure relates to a terminal device. The terminal device includes a destination acquisition section configured to acquire a destination for a user; a personal item detection section configured to detect a personal item that exists around the user; and a notification section configured to, in a case where the personal item associated with a category of the destination is not detected, notify information on the personal item that is not detected. According to the second aspect, in the case where the personal item that is associated with the category of the destination is not detected around the user, the terminal device can notify the information on the personal item that is not detected.

A third aspect of the disclosure relates to a forgetting-to-carry prevention assistance system. The forgetting-to-carry prevention assistance system includes an in-vehicle device that is mounted on a vehicle; and a mobile terminal that is possessed by the user. In the system, at least one of the in-vehicle device and the mobile terminal includes a destination acquisition section configured to acquire a destination for the user, a personal item detection section configured to detect the personal item that exists around the user, and a notification section configured to, in a case where the personal item associated with a category of the destination is not detected, notify the user of information on the personal item that is not detected. According to the third aspect, in the case where the personal item that is associated with the category of the destination is not detected around the user, the forgetting-to-carry prevention assistance system can notify the information on the personal item that is not detected.

According to the above aspects of the disclosure, it is possible to provide a technique of appropriately assisting the user in preventing forgetting to carry the personal item.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a diagram of a schematic configuration of an information processing system in an embodiment;

FIG. 2 is a diagram of functional blocks of a mobile terminal;

FIG. 3 is a diagram of functional blocks of an in-vehicle device;

FIG. 4 shows an example of a personal item DB;

FIG. 5A is a view of an example of a tag ID registration screen;

FIG. 5B is a view of the example of the tag ID registration screen;

FIG. 8 is a view of a notification screen example;

DETAILED DESCRIPTION OF EMBODIMENTS

Figure 5C:
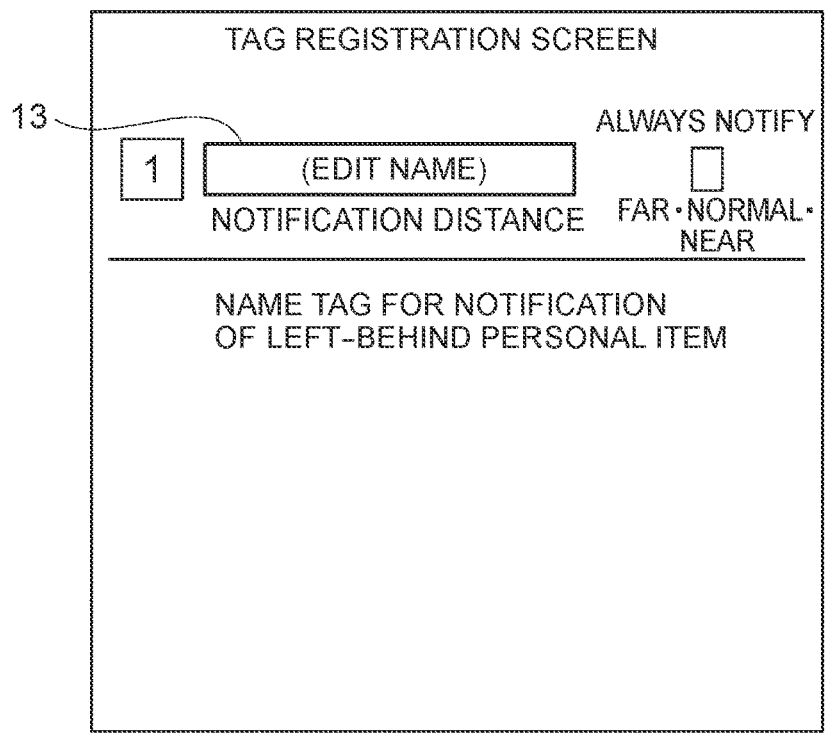
FIG. 5C is a view of the example of the tag ID registration screen.

FIG. 1 shows a schematic configuration of an information processing system 1 in an embodiment. The information processing system 1 includes a mobile terminal 10 possessed by a user A; an in-vehicle device 20 mounted on a vehicle 4; and a server 30 connected to a network 2 such as the Internet. The server 30 is installed in, a data center, for example, and has a function of processing information that is sent from the mobile terminal 10 and the in-vehicle device 20. The information processing system 1 is a forgetting-to-carry prevention assistance system, and assists a user in preventing forgetting to carry a personal item when the user travels (moves).

Each of the mobile terminal 10 and the in-vehicle device 20 is a terminal device that has a function of wirelessly communicating with a wireless station 3 as a base station, and can be connected to the server 30 via the network 2 so as to be able to communicate with the server 30. The mobile terminal 10 and the in-vehicle device 20 can be connected to each other via the wireless station 3. The mobile terminal 10 and the in-vehicle device 20 can be also directly connected to each other via near field wireless communication in a communication area of several tens of meters or less.

The mobile terminal 10 is the terminal device such as a smartphone or a tablet that can be carried by the user, and executes various applications. The applications may be preinstalled in the mobile terminal 10, or may be downloaded from the outside via the network 2 and installed in the mobile terminal 10. The mobile terminal 10 executes an application (hereinafter also referred to as a "scheduler") that manages event information input in a calendar by the user, and an application (hereinafter also referred to as a "travel plan application") that creates a travel plan for the user by deriving a travel route, a travel duration, and the like from the event information managed by the scheduler.

For example, in the case where an event of "arrive at work at 8 a.m." is input as a weekday event in the calendar, the travel plan application derives a travel route for the vehicle 4 from the user's house to a company (XYZ COMPANY) as the user's place of work, and calculates the user's home departure time such that the user A can arrive at the office before 8 a.m. The travel plan application may calculate the user's home departure time by the user A by identifying the travel route with the shortest travel duration among a plurality of travel routes from the user's house to the company and subtracting the travel duration from 8 a.m. as the time at which the user is to arrive at the office. For example, in the case where the shortest travel duration is 20 minutes, the travel plan application may set the user's home departure time at 7:30 a.m. by adding a slight event change duration.

In the case where an event of "ABC GOLF COURSE at 10 a.m." is input as a weekend event in the calendar, the travel plan application derives the travel route for the vehicle 4 from the user's house to ABC GOLF COURSE, and calculates the user's home departure time such that the user A can arrive at ABC GOLF COURSE before 10 a.m. As described above, the travel plan application calculates the user A's home departure time by identifying the travel route with the shortest travel duration and subtracting the travel duration from 10 a.m. as play start time. For example, in the case where the travel duration is estimated to be one and a half hours, the travel plan application may set, the user's home departure time at 8:20 a.m. by adding the slight event change duration.

Thus, the travel plan application derives the user's travel plan for a day, that is, a travel schedule including a destination, travel unit, the departure time, and the like from the event information managed by the scheduler. At five minutes before the derived departure time, the travel plan application notifies the user that it is five minutes before the departure time with the use of voice or the like, and thus assists the user in executing the event input in the calendar. Note that the travel plan application may notify the scheduler of the derived travel schedule, and the scheduler may notify the user that it is five minutes before the departure time. In the embodiment, the scheduler and the travel plan application are installed as separate applications in the mobile terminal 10. However, the scheduler and the travel plan application may be configured as a single application.

Furthermore, the mobile terminal 10 executes an application (hereinafter also referred to as a "forgetting-to-carry prevention assistance application") that assists a user in preventing forgetting to carry a personal item, independently or in cooperation with the in-vehicle device 20. In the information processing system 1 of the embodiment, items that the user A brings to the destination (i.e., personal items) are registered in the server 30 in advance. The forgetting-to-carry prevention assistance application has a function of determining whether the user has forgotten to carry the personal item.

FIG. 2 shows functional blocks of the mobile terminal 10. The mobile terminal 10 includes a processing unit 100, an input unit 130, an output unit 132, a storage unit 134, a global positioning system (GPS) receiver 136, a first communication unit 138, and a second communication unit 140. The processing unit 100 has a function of executing the various applications. More specifically, the processing unit 100 has a function of executing a scheduler 102, a travel plan application 104, and a forgetting-to-carry prevention assistance application 110. The plurality of applications that are executed by the processing unit 100 can cooperate with each other by exchanging data therebetween. In addition to these applications, the processing unit 100 may be also able to execute a navigation application (hereinafter also referred to as "navi app") and other applications. The forgetting-to-carry prevention assistance application 110 executes functions of a destination acquisition section 112, a personal item identification section 114, a confirmation request acquisition section 116, a personal item detection section 118, a determination section 120, and a notification section 122.

Each of the various functions of the mobile terminal 10 can be realized by a circuit block, memory, and another Large-Scale integration (LSI) as hardware, and can be realized by system software, an application program, and the like loaded in the memory as software. Accordingly, a person skilled in the art will understand that each of the various functions of the mobile terminal 10 can be realized by any of various configurations that include the hardware only, the software only, or a combination of the hardware and the software, and thus each of the various functions of the mobile terminal 10 is not limited to any of the various configurations.

The input unit 130 includes an operation input unit operated by the user, such as a touchscreen or buttons; and a voice input unit that receives the user's voice. The input unit 130 provides received data (information) to the processing unit 100. The output unit 132 includes a display section that displays a screen generated by the processing unit 100; and a speaker from which the voice is output. The storage unit 134 includes memory that stores the data. The GPS receiver 136 calculates a location of a host terminal on the basis of a signal from a satellite so as to calculate a latitude and a longitude of the location of the host terminal.

The first communication unit 138 is a communication module that communicates wirelessly with the server 30 via the wireless station 3. Although a standard of the wireless communication is not particularly limited, the standard may be 3G (the third generation of mobile communication system), 4G (the fourth generation of mobile communication system), or 5G (the fifth generation of mobile communication system), for example.

The second communication unit 140 is a communication module for wireless Personal Area Network (PAN) communication or wireless Local Area Network (LAN) communication in a narrower communication area than a communication area of the first communication unit 138. The second communication unit 140 has a function of communicating with the in-vehicle device 20 and also communicating with a wireless tag that is attached to the personal item, so as to acquire a tag ID from the wireless tag.

The wireless tag is a tag that has a function of exchanging data (transmitting and receiving data) with the use of the wireless communication performed by a wireless PAN or wireless LAN system, and the wireless tag in the embodiment is a Bluetooth (registered trademark) Low Energy (BLE) tag. The wireless tag includes identification information (the tag ID) used to identify itself, and the user attaches the wireless tag to the personal item to be carried. The second communication unit 140 is operated as a master in a relationship with the BLE tag and acquires the tag ID from the BLE tag. Tag ID acquisition processing may be executed by the second communication unit 140 in response to receiving a personal item confirmation request that is sent from the in-vehicle device 20. However, the tag ID acquisition processing may be executed in response to another factor, for example, in response to receiving a confirmation request from the travel plan application 104 or a confirmation request from the user. Alternatively, the tag ID acquisition processing may be autonomously executed between the second communication unit 140 and the wireless tag in accordance with a BLE protocol.

FIG. 3 shows functional blocks of the in-vehicle device 20. The in-vehicle device 20 includes a processing unit 200, an input unit 220, an output unit 222, a storage unit 224, a GPS receiver 226, a first communication unit 228, a second communication unit 230, and a vehicle information acquisition unit 232. The processing unit 200 includes a navi app 202, a user state acquisition section 204, a confirmation request generation section 206, a left-behind personal item information acquisition section 208, and a notification section 210.

Each of various functions of the in-vehicle device 20 can be realized by a circuit block, memory, and another LSI as hardware, and can be realized by system software, an application program, and the like loaded in the memory as software. Accordingly, a person skilled in the art will understand that each of the various functions of the in-vehicle device 20 can be realized by any of various configurations that include the hardware only, the software only, or a combination of the hardware and the software, and thus each of the various functions of the in-vehicle device 20 is not limited to any of the various configurations.

The input unit 220 includes an operation input section operated by the user, such as a touchscreen or buttons provided on a dashboard or a center console in a vehicle cabin; and a voice input section that receives the user's voice. The input unit 220 provides the received data (information) to the processing unit 200. The output unit 222 includes a display section that displays a screen generated by the processing unit 200; and a speaker from which the voice is output. The storage unit 224 includes memory that stores the data. The GPS receiver 226 calculates a location of a host terminal on the basis of the signal from the satellite so as to calculate a latitude and a longitude of the location of the host terminal.

The first communication unit 228 is a communication module that communicates wirelessly with the server 30 via the wireless station 3. Although the standard of the wireless communication is not particularly limited, the standard may be 3G (the third generation of mobile communication system), 4G (the fourth generation of mobile communication system), or 5G (the fifth generation of mobile communication system), for example.

The second communication unit 230 is a communication module configured to perform the wireless PAN communication or the wireless LAN communication in a narrower communication area than a communication area of the first communication unit 228. The second communication unit 230 establishes a connection with the second communication unit 140 of the mobile terminal 10 and wirelessly communicates therewith. The second communication unit 230 or the second communication unit 140 may be operated as the master.

The storage unit 224 of the in-vehicle device 20 registers an equipment ID of the second communication unit 140 as an equipment ID of the communication module that is mounted on the user A's mobile terminal 10. The storage unit 134 of the mobile terminal 10 registers an equipment ID of the second communication unit 230 as an equipment ID of the communication module that is mounted on the in-vehicle device 20 of the vehicle 4. In this way, the second communication unit 140 and the second communication unit 230 can recognize each other, and thus the second communication unit 140 and the second communication unit 230 can communicate with each other.

A description will hereinafter be provided on a structure for "forgetting-to-carry prevention assistance" in the embodiment. When the user goes to his/her office, a wallet and a briefcase are usually necessary, but a cart bag (caddie bag) with golf clubs therein is unnecessary. On the other hand, when the user goes to the golf course, the wallet and the cart bag are necessary, but the briefcase is unnecessary.

Thus, in general, an item (or items) to be carried by the user differ(s) according to a destination. In view of the above, the information processing system 1 of the embodiment realizes a structure in which the user registers the personal item corresponding to the destination in the server 30, and in the case where the user forgets to carry the personal item, the user is notified of information on the left-behind personal item (i.e., information on the left-behind personal item is notified to the user). For example, the user registers the wallet and the briefcase as the personal items that the user carries to the office, and registers the wallet and the cart bag as the personal items that the user carries to the golf course, in the server 30.

The server 30 includes a personal item database (a personal item DB) in which the user's destination and the items to be carried to the destination (the personal items) are associated with each other. More specifically, in the personal item DB, the destination and the identification information (the tag ID) of the wireless tag, which is attached to the personal item, are associated with each other and stored. The user attaches the wireless tag to the personal item and registers the tag ID of the attached wireless tag in association with the destination in the server 30.

FIG. 4 shows an example of the personal item DB that is managed in the server 30. The user A registers the destination "XYZ COMPANY" in association with the tag IDs "10000101" and "10030211" of the wireless tags in the personal item DR. Here, "XYZ COMPANY" is a name of the destination and is a facility name of the company where the user A works.

In addition, the user A registers the destination "GOLF COURSE" in association with the tag IDs "10000101" and "21391021", and a destination "SHOPPING CENTER" in association with the tag IDs "10000101" and "34210200" in the personal item DB. Here, each of "GOLF COURSE" and "SHOPPING CENTER" is a category name of the destination and is one of facility categories set in map data such as map data of the navi app. Thus, the user registers the tag ID of the wireless tag, which is attached to the personal item, in association with the name of the destination or the category name of the destination.

In this example, the user A attaches the wireless tag with the tag ID "10000101" to the wallet, attaches the wireless tag with the tag ID "10030211" to the briefcase, attaches the wireless tag with the tag ID "21391021" to the cart bag, and attaches the wireless tag with the tag ID "34210200" to a shopping bag.

In the personal item DB, the tag ID and the name of the personal item are registered and managed for the user A's destination. Hereinafter, a combination of the tag ID and the name of the personal item will be referred to as "personal item information". In the personal item DB, the personal item information regarding the user A and the personal item information regarding various users who participate in the information processing system 1 are recorded in association with the destination.

The user uses his/her own mobile terminal 10 to register the destination and the personal item information in the server 30. Among the various applications that are installed in the mobile terminal 10, the travel plan application 104 may assist the user in a registration operation for the tag ID (i.e., an operation of registering the tag ID). Initially, the user performs an operation of associating the tag ID of the wireless tag that is attached to the item with a name (a nickname) of the item.

A description will hereinafter be provided on an example procedure of the registration operation for the tag ID performed by the user A. The user A causes the mobile terminal 10 to acquire in advance the tag ID of the wireless tag that is going to be attached or has been attached to the personal item. In the embodiment, the wireless tag is the BLE tag. Thus, before initiation of the operation, the user A may place the wireless tag in the vicinity of the mobile terminal 10 and may cause the second communication unit 140 to acquire the tag ID of the wireless tag.

FIG. 5A shows an example of a tag ID registration screen. When the input unit 130 receives an operation for displaying the tag ID registration screen from the user A, the travel plan application 104 generates the tag ID registration screen shown in FIG. 5A and displays the tag ID registration screen in the output unit 132. Management numbers 11a to 11d shown in the tag ID registration screen are numbers used to manage the tag IDs. The user A selects an unregistered management number to perform the registration operation for the tag ID. In the example shown in FIG. 5A, none of the tags ID have been registered, and thus the user A selects the management number 11a in "1".

FIG. 5B shows an example of a tag ID list 12 that is displayed on the tag ID registration screen. When the management number 11a is selected, the travel plan application 104 displays the tag ID list 12 from which the tag ID to be registered in the management number 11a is selected. In the tag ID list 12, the tag IDs of the plurality of wireless tags, which are acquired in advance from the second communication unit 140, are displayed. Note that, in the case where a list of the plurality of tag IDs is not created in advance, the user A may manually cause the mobile terminal 10 to acquire the tag IDs of the wireless tags from the second communication unit 230, or may manually input the tag IDs and associate one of the tag IDs with the management number 11a.

FIG. 5B shows a situation where the tag ID of "10000101" is selected. When the input unit 130 receives a tag ID determination operation from the user A in the state where the tag ID of "10000101" is selected, the travel plan application 104 associates the management number 11a with the tag ID "10000101" and generates a screen used to input the name (the nickname) of the personal item.

FIG. 5C shows an example of a name edit area that is displayed on the tag ID registration screen. The user A inputs the name (the nickname) of the item, to which the wireless tag of the tag ID "0000101" is attached, in a name edit area 13. Note that on a right side of the edit area 13, a check box used to designate whether to always notify (i.e., whether to always provide the notification) and an area used to select a notification distance are provided. "ALWAYS NOTIFY" means that the notification is provided every time a forgetting-to-carry determination condition is satisfied. In the case where the user A desires "ALWAYS NOTIFY", the user A checks the box. The notification distance is a distance regarding detection of the wireless tag, and the notification distance (the distance regarding detection of the wireless tag) can be designated at three stages. For example, "FAR" is 10 m, "NORMAL" is 2 m, and "NEAR" is 0.5 m. In the case where the corresponding item is located within the designated distance, it is determined that the item is not left behind. In the case where the corresponding item is located farther than the designated distance, it is determined that the item is left behind.

Figure 5D:
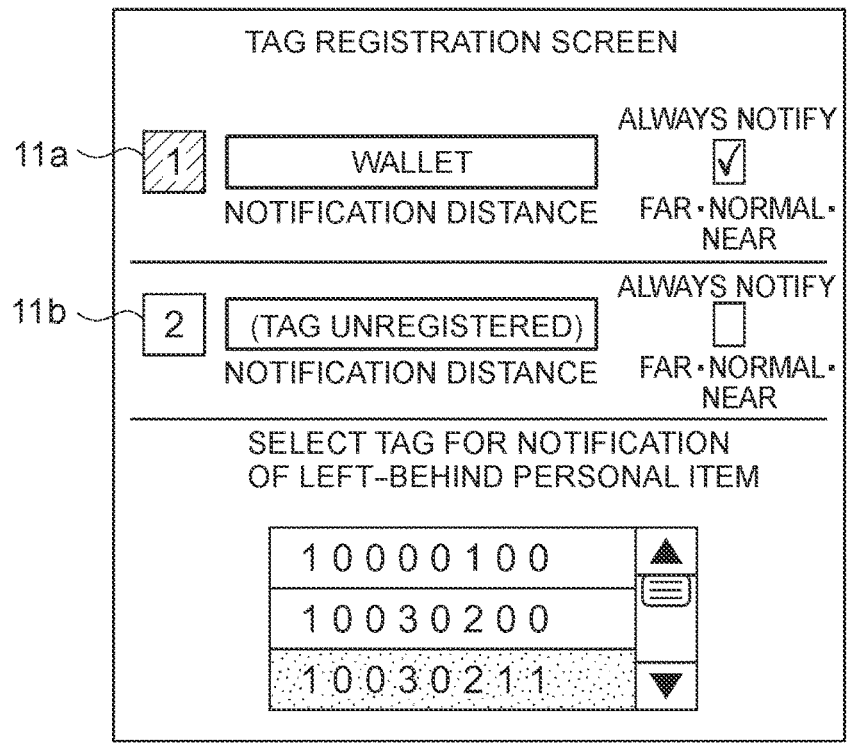
FIG. 5D is a view of another example of the tag ID registration screen.

FIG. 5D shows another example of the tag ID registration screen. FIG. 5D shows a situation where the registration of the tag ID with the management number 11a in "1" is completed and the user A starts the registration operation for another tag ID. In this way, the user A associates the tag IDs with the names (the nicknames). The combinations of the tag IDs and the names (the nicknames) are stored as the personal item information in the storage unit 134.

After completing the operation of associating the tag IDs with the names, the user A performs an operation of associating the tag IDs, which are used to identify the personal items, with the destination. The travel plan application 104 may assist in this operation.

Figure 6A:
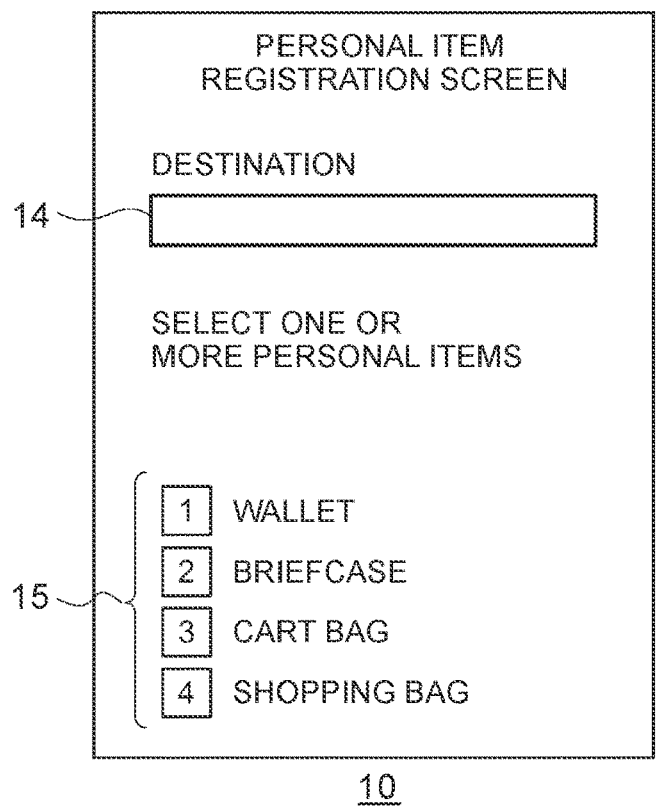
FIG. 6A is a view of an example of a personal item registration screen.

FIG. 6A shows an example of a personal item registration screen. In the personal item registration screen, a destination input field 14 in which the destination is input, and a personal item list 15, from which the personal item to be associated with the destination is selected, are displayed. In the personal item list 15, the names (the nicknames) that are associated with the tag IDs are read from the storage unit 134 and displayed such that the user A can select any of the displayed names (the displayed nicknames). The user A inputs the destination in the destination input field 14 and selects the personal item from the personal item list 15.

Here, an address or a facility name may be input manually as a text into the destination input field 14. However, in the case where the navi app is installed in the mobile terminal 10, the input in the destination input field 14 may be performed in a manner in which the destination is selected from a destination list that is registered in the navi app. In the case where the travel plan application 104 provides the destination of a day to the forgetting-to-carry prevention assistance application 110, the destination that is input in the destination input field 14 may be the destination that is included in a destination database used by the travel plan application 104.

Figure 6B:
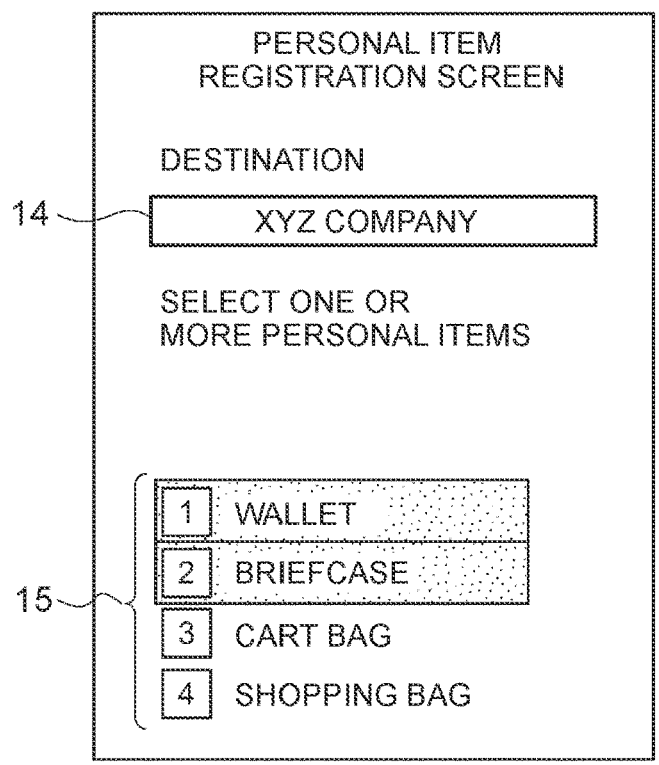
FIG. 6B is a view of the example of the personal item registration screen.

FIG. 6B shows an input example in the personal item registration screen. "XYZ COMPANY" as the user's place of work is input in the destination input field 14, and the wallet and the briefcase are selected from the personal item list 15. When the input unit 130 receives a personal item determination operation from the user A in this state, the travel plan application 104 associates information on the selected personal items, that is, the personal item information as the combinations of the tag IDs and the names of the personal items, with the destination "XYZ COMPANY" and sends the information on the selected personal items to the server 30.

In this way, the user A stores the personal item information and the destination that are associated with each other, in the personal item DB of the server 30. In the embodiment, the server 30 manages the personal item DB in which the destination and the personal item information are associated with each other for each of the users. In this way, once the destination is determined, the mobile terminal 10 can acquire the personal item information that is associated with the destination from the server 30, and thus can check whether the user has forgotten to carry the personal item. Note that, in a modified example, the personal item DB may be held by each of the mobile terminals 10.

In the information processing system 1 of the embodiment, the forgetting-to-carry prevention assistance application 110 can determine whether the user has forgotten to carry the personal item at various timing. A description will hereinafter be provided on the case where the forgetting-to-carry prevention assistance application 110 determines whether the user A has forgotten to carry the personal item at timing at which the user A gets on or gets out of the vehicle 4.

Figure 7:
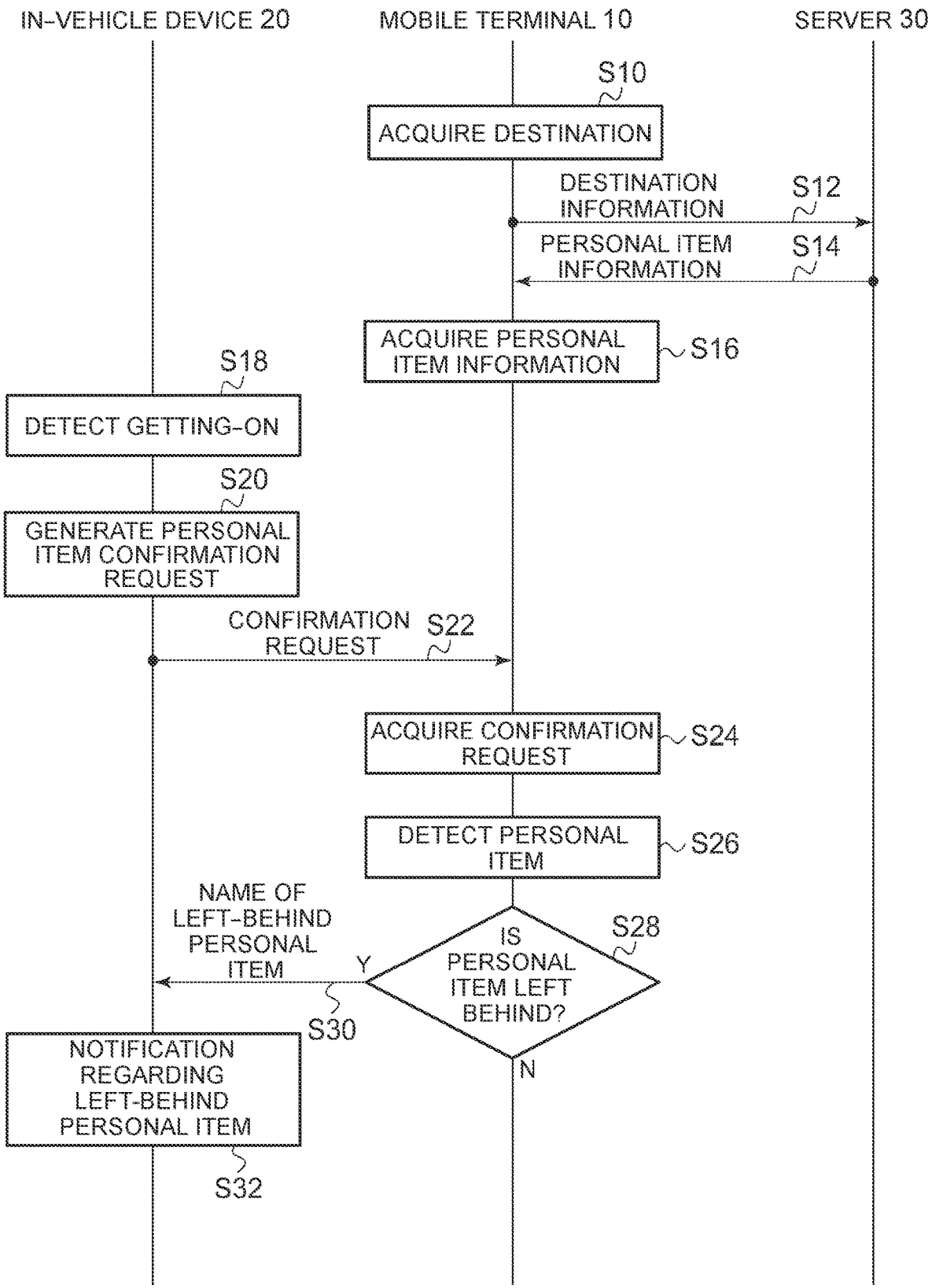
FIG. 7 is view of an example of a forgetting-to-carry prevention assistance sequence at the time of getting on a vehicle.

FIG. 7 is an example of a forgetting-to-carry prevention assistance sequence at the time when the user gets on the vehicle 4. In the mobile terminal 10, the forgetting-to-carry prevention assistance application 110 has been started, and thus the forgetting-to-carry prevention assistance application 110 is in a state where the various functions thereof can be executed. The forgetting-to-carry prevention assistance application 110 may be started by the user A, or may be automatically started when the mobile terminal 10 approaches the vehicle 4, for example.

The destination acquisition section 112 acquires the user A's destination (S10). In the mobile terminal 10, the travel plan application 104 derives the user's travel schedule including the destination of a day, the travel unit, the departure time, and the like from the event information managed by the scheduler 102. The destination acquisition section 112 receives the travel schedule in advance that is derived by the travel plan application 104. In this way, the destination acquisition section 112 acquires the destination for the user A before the user A gets on the vehicle 4. Note that the user A may manually input the destination for the user A. In any of these cases, the destination acquisition section 112 acquires the destination information that is the information on the destination to which the vehicle 4 travels before the user A gets on the vehicle 4.

The personal item identification section 114 identifies the personal item that is associated with the destination acquired by the destination acquisition section 112. More specifically, the personal item identification section 114 sends an acquisition request for the personal item information that is associated with the destination, to the server 30 via the first communication unit 138 (S12). This acquisition request includes the destination information that is acquired by the destination acquisition section 112. Here, it is assumed that the destination is "XYZ COMPANY". When receiving the acquisition request, the server 30 searches the personal item DB with the use of a user ID of the user A and the destination information, extracts the personal item information regarding the user A, which is associated with "XYZ COMPANY", and sends the personal item information to the mobile terminal 10 (S14). Here, with reference to FIG. 4, the personal item information that includes the tag ID "10000101" and the name "WALLET" and the personal item information that includes the tag ID "10030211" and the name "BRIEFCASE" are associated with "XYZ COMPANY". Thus, these pieces of the personal item information are sent to the mobile terminal 10 and acquired by the personal item identification section 114 (S16).

More specifically, the server 30 searches for the personal item information associated with the name of the destination included in the acquisition request, in the personal item DB. The name of the destination is the user A's destination itself and is "XYZ COMPANY" in this case. Note that, in the case where the "DESTINATION" registered in the personal item DB includes the category name of the destination, the server 30 searches for the personal item information that is associated with the category of the destination included in the acquisition request. For example, in the case where the name of the destination included in the acquisition request is "ABC GOLF COURSE", the server 30 determines that the facility category name of "ABC GOLF COURSE" is "GOLF COURSE", and searches the personal item DB to determine whether each of "ABC GOLF COURSE" and "GOLF COURSE" is registered as the destination. With reference to FIG. 4, "GOLF COURSE" is registered as "DESTINATION". Thus, when "ABC GOLF COURSE" is included in the acquisition request, the server 30 extracts the personal item information that is associated with "GOLF COURSE" from the personal item DB, and sends the personal item information to the mobile terminal 10.

The personal item identification section 114 acquires the personal item information that is associated with the name or the category of the destination from the server 30, and stores the personal item information in the storage unit 134 (S16). In the embodiment, the travel plan application 104 derives the travel schedule of the (given) day by a day before the (given) day. At the beginning of the day (12 a.m.), the destination acquisition section 112 may acquire the destination information from the travel plan application 104, and the personal item identification section 114 may acquire the personal item information from the server 30.

Note that, even in the case where the travel plan application 104 does not derive the travel schedule of the day, the user A's destination is identified when the user A inputs the destination in the navi app of the mobile terminal 10 before leaving his/her home or when the user A inputs the destination in the navi app 202 of the in-vehicle device 20 after getting on the vehicle 4. At this time, the destination acquisition section 112 may acquire the destination information, and the personal item identification section 114 may acquire the personal item information from the server 30. Note that, in the case where the personal item DB is stored in the storage unit 134 of the mobile terminal 10, the personal item identification section 114 can acquire the personal item information that is associated with the name or the category of the destination with reference to the personal item DB of the storage unit 134.

In the weekday morning, five minutes prior to the user's home departure time, the travel plan application 104 notifies the user A that it is five minutes before the departure time by the voice or the like. The notified user A leaves his/her home and gets on the vehicle 4. The user state acquisition section 204 acquires the user state with respect to the vehicle 4 on the basis of vehicle state information that is acquired by the vehicle information acquisition unit 232. The user state with respect to the vehicle 4 includes at least a state in which the user is in the vehicle, and a state in which the user is not in the vehicle. The state in which the user is not in the vehicle includes a state in which the user has gotten out of the vehicle.

The vehicle information acquisition unit 232 acquires and supplies operation states of various switches, a camera image of the inside of a vehicle cabin, and the like to the user state acquisition section 204. When the vehicle information acquisition unit 232 detects that the user A has brought an accessory switch or an ignition switch to an ON state, the user state acquisition section 204 detects that the user A is in the vehicle (S18). Alternatively, the vehicle information acquisition unit 232 may provide the user state acquisition section 204 with the camera image, and the user state acquisition section 204 may execute image recognition processing on the camera image to detect that the user A is seated on a driver's seat. At this time, the user state acquisition section 204 detects that the user A is in the vehicle 4 and is a driver. In addition, since the user A's mobile terminal 10 and the in-vehicle device 20 can connect to each other via the near field wireless communication by using the second communication unit 140 and the second communication unit 230, respectively, the user state acquisition section 204 may detect that the user A is in the vehicle 4 through the communication of the second communication unit 230 with the second communication unit 140. In some embodiments, the second communication unit 140 and the second communication unit 230 should immediately establish the connection when the mobile terminal 10 enters the communication area of the in-vehicle device 20 and the in-vehicle device 20 enters the communication area of the mobile terminal 10. Here, as described above, any one of the second communication unit 140 and the second communication unit 230 may be operated as the master.

The confirmation request generation section 206 generates the personal item confirmation request (S20) and sends the personal item confirmation request to the mobile terminal 10 via the second communication unit 230 (S22). The personal item confirmation request is a request that causes the mobile terminal 10 to confirm whether the user has forgotten to carry the personal item that is associated with the name or the category of the destination.

When the confirmation request acquisition section 116 in the mobile terminal 10 acquires the personal item confirmation request via the second communication unit 140 (S24), the personal item detection section 118 detects the personal item that exists around the user A, that is, around the mobile terminal 10 (S26). This personal item detection processing is processing in which the second communication unit 140 acquires the tag ID from the wireless tag that exists around the second communication unit 140, thereby detecting the item to which the wireless tag is attached. At this time, the personal item detection section 118 acquires the tag ID "10030211" from the wireless tag around the user A. The acquired tag ID is sent to the determination section 120.

The determination section 120 determines whether all the personal items identified based on the personal item information acquired in S16 have been brought in the vehicle 4. In this example, in S16, the personal item identification section 114 acquires two pieces of the personal item information associated with "XYZ COMPANY", more specifically, a combination of the tag ID "10000101" and the name "WALLET" and a combination of the tag ID "10030211" and the name "BRIEFCASE". If the tag IDs that are included in all the pieces of the personal item information have been acquired by the personal item detection section 118, the determination section 120 determines that the user has not forgotten to carry the personal items (i.e., the personal items are not left behind) (N in S28).

On the other hand, if the tag ID that is included in at least one piece of the personal item information is not acquired by the personal item detection section 118, the determination section 120 determines that the user has forgotten to carry the personal item (i.e., the personal item is left behind) (Y in S28). That is, in the case where the personal item that is associated with the name or the category of the destination is not detected by the personal item detection section 118, the determination section 120 determines that the user has forgotten to carry the personal item. In this example, the personal item detection section 118 acquires the tag ID "10030211", but does not acquire the tag ID "10000101". Accordingly, the determination section 120 determines that the user has forgotten to carry the item corresponding to the tag ID "10000101".

The notification section 122 identifies the information on the personal item (the left-behind personal item) that corresponds to the tag ID "10000101" based on the personal item information, and notifies the in-vehicle device 20 of the information on the left-behind personal item via the second communication unit 140 (i.e., notifies the information on the left-behind personal item to the in-vehicle device 20 via the second communication unit 140). In the in-vehicle device 20, the left-behind personal item information acquisition section 208 acquires the information on the left-behind personal item via the second communication unit 230, and the notification section 210 notifies the user of the information on the left-behind personal item via the output, unit 222

(S30) (i.e., the notification section 210 notifies the information on the left-behind personal item to the user via the output unit 222). The information on the left-behind personal item may be the name of left-behind personal item, and is "WALLET" in this case. The user is, notified by the screen display and/or the voice output (S32).

FIG. 8 shows a notification example that is displayed on the output unit 222. As shown in FIG. 8, the notification section 210 may display a notification screen on the display section or may output notification voice via the speaker. Note that the notification regarding the left-behind personal item may be provided by the notification section 210 before the vehicle 4 starts. In this way, the user A can notice that he/she has left the wallet in his/her house before the start of the vehicle 4.

In the case where the user A is the driver, it is considered that the user A can easily check the display section of the in-vehicle device 20 after getting on the vehicle 4. Thus, in the embodiment, the notification regarding the left-behind personal item that is provided to the driver is output from the output unit 222 of the in-vehicle device 20. Note that the notification regarding the left-behind personal item may be output from the output unit 132 of the mobile terminal 10 or may be output from both of the output unit 132 of the mobile terminal 10 and the output unit 222 of the in-vehicle device 20.

In the embodiment, the left-behind personal item notification screen for the driver is output from the output unit 222 that is provided in the dashboard or the center console of the vehicle 4. Thus, for a passenger other than the driver, the left-behind personal item notification screen is output from the output unit 132 of the passenger's mobile terminal 10 instead of the output unit 222. For example, whether the user A is the driver or the passenger may be determined by the image recognition processing that uses the camera image of the inside of the vehicle cabin.

The user state acquisition section 204 can identify the user in the vehicle 4 by executing the image recognition processing using the camera image. When the user state acquisition section 204 detects that the user A is seated on the driver's seat, the confirmation request generation section 206 adds information indicating that the user A is the driver in the confirmation request sent to the user A's mobile terminal 10. When the user state acquisition section 204 detects that the user A is seated on a seat other than the driver's seat, the confirmation request generation section 206 adds information indicating that the user A is not the driver and is the passenger in the confirmation request sent to the user A's mobile terminal 10. In this way, when the confirmation request acquisition section 116 in the mobile terminal 10 acquires the confirmation request, it is determined whether the user A is the driver. If it is determined that the user A is not the driver, and the determination section 120 determines that the user A has forgotten to carry the personal item in step S28 shown in FIG. 7 (Y in S28), the notification section 122 does not notify the in-vehicle device 20 of the information on the left-behind personal item, and notifies the user A of the information on the left-behind personal item via the output unit 132.

As it has been described so far, when the user A gets on the vehicle 4, the forgetting-to-carry prevention assistance application 110 searches for the personal item associated with the name or the category of the destination, in the vehicle cabin. In the case where the personal item does not exist in the vehicle 4, the forgetting-to-carry prevention assistance application 110 notifies the user A of the personal item as the left-behind personal item. The notification regarding the left-behind personal item is provided before the vehicle 4 starts traveling. In this way, the user A can notice the left-behind personal item before leaving home.

Note that the personal item detection section 118 detects the personal item existing around the mobile terminal 10, and at this time, the personal item detection section 118 may detect a distance from the personal item (i.e., a distance between the mobile terminal 10 and the personal item detection section 118). For example, the personal item detection section 118 detects the distance from the personal item on the basis of intensity of the received signal from the wireless tag of the personal item. For example, in the case where the distance from the personal item is 10 m, there is a high possibility that the personal item does not exist in the vehicle cabin. Accordingly, in the case where the detected distance exceeds a specified distance, the determination section 120 may determine that the user A has forgotten to carry the personal item (i.e., the personal item is left behind), and the notification section 122 may notify the information on the personal item (i.e., the notification section 122 may provide the information on the personal item). As described with reference to FIG. 5D, a threshold of this distance may be set for each item.

Here, there is a case where the distance from the personal item, which is detected by the personal item detection section 118, is equal to or shorter than the specified distance before the start of the vehicle 4 but exceeds the specified distance after the start of the vehicle 4. In this case, the determination section 120 determines that the user A has forgotten to carry the personal item, and the notification section 122 may notify the information on the personal item. Note that, after the vehicle 4 travels through the specified distance (for example, 10 m) or longer, the personal item detection section 118 may stop the processing of detecting the distance between the mobile terminal 10 and the personal item.

As it has been described with reference to FIG. 7, in the case where it is determined that the user A has forgotten to carry the personal item when the user A gets on the vehicle 4, the notification regarding the left-behind personal item is immediately provided. Thus, the user A can notice the left-behind personal item and return to his/her house to pick up the left-behind personal item.

Figure 9:
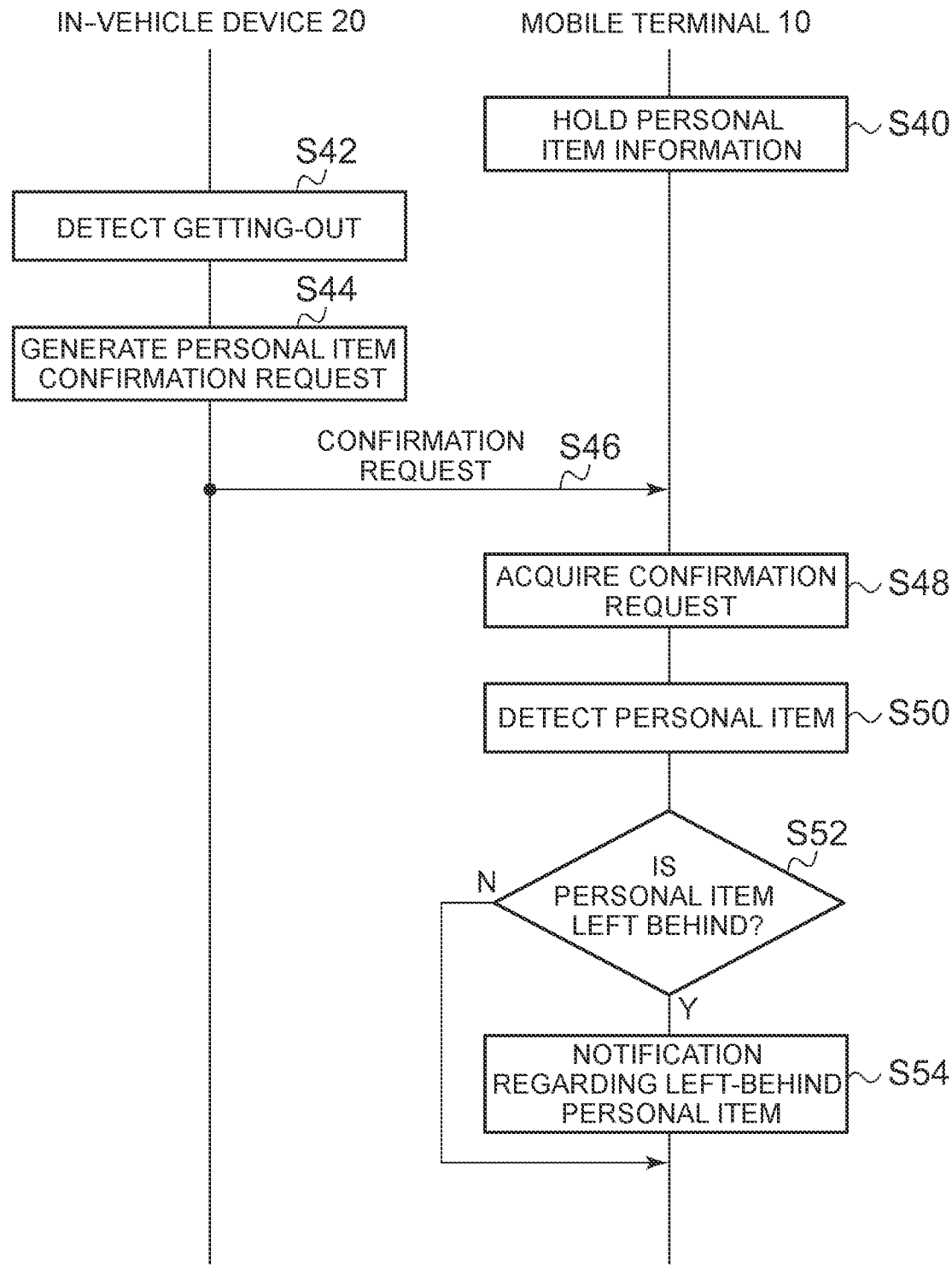
FIG. 9 is a view of an example of a forgetting-to-carry prevention assistance sequence at the time of getting out of the vehicle.

Next, a description will be provided on a forgetting-to-carry prevention assistance sequence at the time when the vehicle 4 arrives at the destination. FIG. 9 shows an example of the forgetting-to-carry prevention assistance sequence at the time when the user gets out of the vehicle 4. When the vehicle 4 arrives at the destination, the personal item information that is associated with XYZ COMPANY as the destination is held in the storage unit 134 (S40). As described in S16 shown in FIG. 7, the personal item identification section 114 acquires the personal item information from the server 30 and stores the personal item information in the storage unit 134, before the vehicle 4 leaves for the destination.

In the case where the vehicle information acquisition unit 232 detects that a door is locked after the user A brings the accessory switch to an OFF state and the door is opened and closed, the user state acquisition section 204 detects that the user A has gotten out of the vehicle 4 (S42). Note that the vehicle information acquisition unit 232 may acquire the camera image of the inside of the vehicle cabin and provide the user state acquisition section 204 with the camera image, an the user state acquisition section 204 may execute the image recognition processing using the camera image to recognize that the user A has moved to the outside of the vehicle 4. At this time, the user state acquisition section 204 detects that the user A has gotten out of the vehicle 4. In addition, the processing unit 200 of the in-vehicle device 20 may monitor radio waves of a smart key, and the user state acquisition section 204 may detect that the user A has gotten out of the vehicle 4 when intensity of the radio waves becomes smaller than a specified threshold. Alternatively, when the second communication unit 230 of the in-vehicle device 20 detects the distance between the second communication unit 230 and the second communication unit 140 of the mobile terminal 10 based on the intensity of the received signal, the user state acquisition section 204 may detect that the user A has gotten out of the vehicle 4.

The confirmation request generation section 206 generates the personal item confirmation request (S44) and sends the personal item confirmation request to the mobile terminal 10 via the second communication unit 230 (S46). The personal item confirmation request is a request that causes the mobile terminal 10 to confirm whether the user has left, in the vehicle cabin, the personal item carried to the destination.

In the case where the confirmation request acquisition section 116 in the mobile terminal 10 acquires the personal item confirmation request via the second communication unit 140 (S48), the personal item detection section 118 detects the personal item that exists around the user who is outside the vehicle 4, that is, around the mobile terminal 10 (S50). This personal item detection processing is the processing in which the second communication unit 140 acquires the tag ID from the wireless tag that exists around the second communication unit 140, thereby detecting the item to which the wireless tag is attached. The acquired tag ID is sent to the determination section 120.

The determination section 120 determines whether the personal item that is identified based on the personal item information held in the storage unit 134 exists around the user A. In the storage unit 134, the two pieces of the personal item information, which are associated with "XYZ COMPANY", more specifically, the combination of the tag ID "10000101" and the name "WALLET" and the combination of the tag ID "10030211" and the name "BRIEFCASE" are stored. If the tag IDs that are included in all the pieces of the personal item information are acquired by the personal item detection section 118, the determination section 120 determines that the user has not forgotten to carry the personal item (N in S52).

On the other hand, if the tag ID that is included in at least one pieces of the personal item information is not acquired by the personal item detection section 118, the determination section 120 determines that the user has forgotten to carry the personal item (Y in S52). In the case where the personal item detection section 118 acquires the tag ID "10000101" but cannot acquire the tag ID "10030211", the determination section 120 determines that the item corresponding to the tag ID "10030211" is forgotten to be carried (left behind), and provides the tag ID "10030211" to the notification section 122.

The notification section 122 identifies the information on the left-behind personal item that corresponds to the tag ID "10030211" based on the personal item information, and notifies the user A of the information on the left-behind personal item via the output unit 132 (S54). The information on the left-behind personal item may be the name of the left-behind personal item and is "BRIEFCASE" in this case. The user is notified by the screen display and/or the voice output.

Figure 10:
FIG. 10 is a view of a notification screen example.

FIG. 10 shows a notification example that is displayed on the output unit 132. As shown in FIG. 10, the notification section 122 may display the notification screen on the display section or may output notification voice via the speaker. Note that the notification regarding the left-behind personal item by the notification section 122 may be provided before the user A moves far from the vehicle 4. In this way, the user A can notice that he/she has left the briefcase in the vehicle cabin, at a location near the vehicle 4.

For the above reason, the user state acquisition section 204 monitors a distance between the vehicle 4 and the user A with the use of the intensity of the received signal from the mobile terminal 10 or the smart key. When determining that the distance between the vehicle 4 and the user A is equal to a specified distance (for example, 2 m), the user state acquisition section 204 supplies a confirmation request generation command (i.e., a command to generate the confirmation request) to the confirmation request generation section 206, and the confirmation request generation section 206 sends the confirmation request to the mobile terminal 10. In this way, in the case where the user has left the personal item in the vehicle cabin, the forgetting-to-carry prevention assistance application 110 can notify the user of the left-behind personal item at a location where the user is not so for away from the vehicle 4.

In the case where the user state acquisition section 204 detects getting-on of the user A (i.e., detects that the user A gets on the vehicle 4) when the user A finishes work at the office and is going to drive the vehicle 4 home, the confirmation request generation section 206 may send the personal item confirmation request to the mobile terminal 10. At this time, the personal item information that is associated with XYZ COMPANY as the last destination is held in the storage unit 134 of the mobile terminal 10. The personal item detection section 118 may detect the personal item(s) around the user A, and the determination section 120 may determine whether the user A has brought back, from XYZ COMPANY, the personal items that the user A carried to XYZ COMPANY, that is, "WALLET" and "BRIEFCASE". That is, when the user A gets on the vehicle 4, the forgetting-to-carry prevention assistance sequence, which is shown in FIG. 7, may be executed for the current destination and for the last destination. Note that, also in this case, the last personal item information and the last left-behind personal item information may be deleted from the storage unit 134 when the user A arrives at his/her home. When the user A leaves his/her home next time, the forgetting-to-carry prevention assistance sequence that is related to the personal item information associated with the new destination may be activated.

The disclosure has been described so far on the basis of the embodiment. The embodiment is merely illustrative, and a person skilled in the art will understand that various modifications can be made to a combination of the components and a combination of the processes and that such modifications fall within the scope of the disclosure. In the embodiment, the forgetting-to-carry prevention assistance application 110 is installed in the mobile terminal 10, and the mobile terminal 10 executes the forgetting-to-carry prevention assistance processing (i.e., the processing for assisting in the prevention of forgetting to carry the personal item). However, the forgetting-to-carry prevention assistance application 110 may be installed in the in-vehicle device 20, and the in-vehicle device 20 may execute the forgetting-to-carry prevention assistance processing.

What is claimed is:

1. A forgetting-to-carry prevention assistance method that assists, in a terminal device, a user in preventing forgetting to carry a personal item, the forgetting-to-carry prevention assistance method comprising:

acquiring a destination for the user;

detecting whether the personal item exists around the user; and in a case where the personal item associated with a category of the destination is not detected, notifying information on the personal item that is not detected, wherein:

detecting whether the personal item exists includes detecting whether the personal item exists when a confirmation request that is sent from an in-vehicle device mounted on a vehicle is received by the terminal device, the in-vehicle device sends the confirmation request to the terminal device based on information on a state of the vehicle, and the state of the vehicle includes at least a state in which the user is in the vehicle, and a state in which the user is not in the vehicle.

2. The forgetting-to-carry prevention assistance method according to claim 1, wherein:

detecting whether the personal item exists around the user includes detecting a distance from the personal item; and notifying the information includes, in a case where the distance from the personal item associated with the category of the destination exceeds a specified distance, notifying the information on the personal item.

3. The forgetting-to-carry prevention assistance method according to claim 2 further comprising determining that the user has forgotten to carry the personal item in the case where the distance from the personal item exceeds the specified distance.

4. A terminal device comprising a processing unit configured to execute one or more applications that cause the terminal device to:

acquire a destination for a user;

detect whether a personal item exists around the user; and in a case where the personal item associated with a category of the destination is not detected, notify information on the personal item that is not detected, wherein:

the terminal device detects whether the personal item exists around the user when a confirmation request that is sent from an in-vehicle device mounted on a vehicle is received by the terminal device, the in-vehicle device sends the confirmation request to the terminal device based on information on a state of the vehicle, and the state of the vehicle includes at least a state in which the user is in the vehicle, and a state in which the user is not in the vehicle.

5. A forgetting-to-carry prevention assistance system that assists a user in preventing forgetting to carry a personal item, the forgetting-to-carry prevention assistance system comprising:

an in-vehicle device that is mounted on a vehicle; and a mobile terminal that is possessed by the user, wherein at least one of the in-vehicle device and the mobile terminal includes a processing unit configured to execute applications that cause the at least one of the in-vehicle device and the mobile terminal to acquire a destination for the user, detect whether the personal item exists around the user, and in a case where the personal item associated with a category of the destination is not detected, notify the user of information on the personal item that is not detected, the at least one of the in-vehicle device and the mobile terminal detects whether the personal item exists around the user when a confirmation request that is sent from the in-vehicle device is received by the mobile terminal, the in-vehicle device sends the confirmation request to the mobile terminal based on information on a state of the vehicle, and the state of the vehicle includes at least a state in which the user is in the vehicle, and a state in which the user is not in the vehicle.

* * * * *

UNITED STATES PATENT AND TRADEMARK OFFICE
CERTIFICATE OF CORRECTION

PATENT NO.          : 10,769,930 B2
APPLICATION NO.     : 16/295452
DATED               : September 8, 2020
INVENTOR(S)         : Akira Sasaki and Masashi Nakagawa Page 1 of 1

It is certified that error appears in the above-identified patent and that said Letters Patent is hereby corrected as shown below:

On the Title Page

Item (72), inventor 1, city, delete "Miyoshi" and insert --Miyoshi-shi Aichi-ken--, therefor.

Item (72), inventor 2, city, delete "Toyota" and insert --Toyota-shi Aichi-ken--, therefor.

In the Specification

In Column 3, Line(s) 32, after "in", delete ",".

In Column 4, Line(s) 21, after "set", delete ",".

In Column 8, Line(s) 45, delete ""0000101"" and insert --"10000101"--, therefor.

In Column 13, Line(s) 5, after "user is", delete ",".

In Column 14, Line(s) 65, delete "an" and insert --and--, therefor.

In Column 16, Line(s) 26, delete "for" and insert --far--, therefor.

Signed and Sealed this
Fifth Day of January, 2021

Andrei Iancu
*Director of the United States Patent and Trademark Office*